United States Patent
Inomoto et al.

(10) Patent No.: US 10,006,523 B2
(45) Date of Patent: Jun. 26, 2018

(54) POWER UNIT HAVING CAM CHAIN TENSIONER PIVOT MECHANISM

(71) Applicant: HONDA MOTOR CO., LTD., Tokyo (JP)

(72) Inventors: Yutaka Inomoto, Wako (JP); Koji Kobayashi, Wako (JP); Keita Shigematsu, Wako (JP); Takamori Shirasuna, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 106 days.

(21) Appl. No.: 15/271,711

(22) Filed: Sep. 21, 2016

(65) Prior Publication Data

US 2017/0089432 A1    Mar. 30, 2017

(30) Foreign Application Priority Data

Sep. 25, 2015 (JP) ................... 2015-187769

(51) Int. Cl.

| F01L 1/02 | (2006.01) |
|---|---|
| F16H 7/08 | (2006.01) |
| F01L 1/04 | (2006.01) |
| F02F 7/00 | (2006.01) |
| F16H 7/06 | (2006.01) |
| F01L 1/22 | (2006.01) |
| F02B 61/02 | (2006.01) |
| F16H 7/18 | (2006.01) |

(52) U.S. Cl.
CPC .............. *F16H 7/08* (2013.01); *F01L 1/02* (2013.01); *F01L 1/022* (2013.01); *F01L 1/042* (2013.01); *F01L 1/22* (2013.01); *F02B 61/02* (2013.01); *F02F 7/0021* (2013.01); *F16H 7/06* (2013.01); *F16H 7/18* (2013.01); *F02F 2007/0041* (2013.01); *F16H 2007/0872* (2013.01); *F16H 2007/0893* (2013.01)

(58) Field of Classification Search
CPC ........ F16H 7/06; F16H 7/08; F16H 7/18; F01L 1/022; F01L 1/042; F01L 1/22
USPC ................... 123/90.16, 90.27, 90.31
See application file for complete search history.

(56) References Cited

U.S. PATENT DOCUMENTS 7,156,060 B2 * 1/2007 Oshita .............. F01L 1/02
                                              123/90.17

FOREIGN PATENT DOCUMENTS

| JP | 3-102007 U | 10/1991 |
|---|---|---|
| JP | 2004124998 A | 4/2004 |
| JP | 2010-101301 A | 5/2010 |

* cited by examiner

*Primary Examiner* — Ching Chang
(74) *Attorney, Agent, or Firm* — Birch, Stewart, Kolasch & Birch, LLP

(57) ABSTRACT

A compact power unit with a sufficient clearance between a stud bolt and a fixing shaft of a cam chain tensioner pivot mechanism for supporting a cam chain tensioner guide. The power unit including a crankshaft, a stud bolt configured to fix a crankcase and a cylinder body to each other, a cam chain, a cam chain tensioner mechanism including a cam chain tensioner guide, and a cam chain tensioner pivot mechanism including a pivot plate, a fixing shaft, and a swinging shaft, the fixing shaft and the swinging shaft are arranged so as to straddle the axis of the stud bolt as viewed in the axial direction of the crankshaft.

18 Claims, 12 Drawing Sheets

POWER UNIT HAVING CAM CHAIN TENSIONER PIVOT MECHANISM

CROSS-REFERENCE TO RELATED APPLICATIONS

The present application claims priority under 35 USC 119 to Japanese Patent Application No. 2015-187769 filed Sep. 25, 2015 the entire contents of which are hereby incorporated by reference.

BACKGROUND OF THE INVENTION

1. Field of the Invention

The present invention relates to a power unit having a cam chain tensioner pivot mechanism that swingably and pivotally supports a cam chain tensioner guide providing a tension to a cam chain transmitting power to a valve system of an internal combustion engine.

2. Description of Background Art

A cam chain tensioner guide is known that is swingably and pivotally supported by a cam chain tensioner pivot mechanism that is biased by a tensioner to press a cam chain and thus provide a tension to the cam chain. This cam chain tensioner pivot mechanism includes a pivot plate, a fixing shaft and a swinging shaft. The pivot plate is fixed to a crankcase of a power unit by the fixing shaft. The swinging shaft supported by the pivot plate and the crankcase swingably supports the cam chain tensioner guide. See, for example, Japanese Patent Laid-Open No. 2010-101301.

However, such a cam chain tensioner pivot mechanism needs to be disposed so as to avoid other members such as a crankshaft, a clutch, and the like. More particularly, when there is no space for the disposition below the crankshaft, the cam chain tensioner pivot mechanism needs to be disposed at a position near a cylinder. When the arrangement in the past is applied, a stud bolt and the fixing shaft of the cam chain tensioner pivot mechanism are close to each other, so that a sufficient clearance between the stud bolt and the fixing shaft may not be obtained.

SUMMARY AND OBJECTS OF THE INVENTION

The present invention solves the above-described problems. It is an object of an embodiment of the present invention to provide a compact power unit while securing a sufficient clearance between a stud bolt and a fixing shaft of a cam chain tensioner pivot mechanism for positively supporting a cam chain tensioner guide.

According to an embodiment of the present invention, there is provided a power unit having a cam chain tensioner pivot mechanism wherein the power unit includes a crankcase; a cylinder body including a cylinder, and disposed in contact with the crankcase; a crankshaft rotatably supported by the crankcase; a plurality of stud bolts configured to fix the crankcase and the cylinder body to each other; a cam chain driving sprocket disposed at one end portion of the crankshaft and a cam chain wound around the cam chain driving sprocket. The cam chain transmits power to a valve gear with a cam chain tensioner mechanism including a cam chain tensioner guide providing a tension to the cam chain. A cam chain tensioner pivot mechanism is configured to swingably support the cam chain tensioner guide by a pivot plate fixed to the crankcase by a fixing shaft and a swinging shaft inserted through the cam chain tensioner guide. As viewed in an axial direction of the crankshaft, the fixing shaft and the swinging shaft are arranged so as to straddle an axis of at least one stud bolt of the plurality of stud bolts.

According to an embodiment of the present invention, the swinging shaft and the fixing shaft of the cam chain tensioner pivot mechanism are arranged so as to straddle the axis of the stud bolt as viewed in the axial direction of the crankshaft. It is thus possible to swingably fix the cam chain tensioner guide surely while obtaining a sufficient clearance between the stud bolt and the fixing shaft of the cam chain tensioner pivot mechanism. Thus, the power unit can therefore be miniaturized.

According to an embodiment of the present invention, the cam chain tensioner pivot mechanism may be disposed nearer to the valve gear than the crankshaft in a direction of a cylinder axis of the cylinder, the crankcase may be provided with a rib extending from a side of the cylinder body, and the rib may have a boss portion to which the fixing shaft is fixed.

According to an embodiment of the present invention, in the cam chain tensioner pivot mechanism disposed nearer to the valve gear than the crankshaft in the direction of the cylinder axis of the cylinder, the boss portion for fixing the fixing shaft is formed on the rib extending to the inside of the crankcase. Thus, the boss portion can be formed easily, and the fixing shaft can be fixed securely while the strength of the boss portion is ensured.

According to an embodiment of the present invention, the crankcase may support a main shaft to which power from the crankshaft is transmitted, a clutch mechanism configured to connect and disconnect the power from the crankshaft may be disposed at one end portion of the main shaft, and the clutch mechanism and at least part of the cam chain tensioner pivot mechanism may be arranged so as to overlap each other as viewed in the direction of the cylinder axis.

According to an embodiment of the present invention, the cam chain tensioner pivot mechanism is disposed such that the clutch mechanism and at least part of the cam chain tensioner pivot mechanism overlap with each other as viewed in the direction of the cylinder axis. Thus, the cam chain tensioner mechanism can be disposed compactly. Thus, the whole of the power unit can therefore be further miniaturized.

According to an embodiment of the present invention, a primary drive gear transmitting the power from the crankshaft may be disposed on one side of the crankshaft, a primary driven gear meshing with the primary drive gear on an inside of the clutch mechanism may be disposed on one side of the main shaft, and the rib may be disposed so as to overlap the primary driven gear as viewed in the direction of the cylinder axis.

According to an embodiment of the present invention, the rib is disposed so as to overlap the primary driven gear. Thus, while the clutch and the primary driven gear are disposed in the vicinity of the rib to which the fixing shaft is fixed, the swinging shaft of the cam chain tensioner pivot mechanism is made to support the cam chain tensioner guide. It is therefore possible to dispose the cam chain in the vicinity of the clutch and the primary driven gear while displacing the cam chain. Thus, the power unit can therefore be made more compact.

According to an embodiment of the present invention, the power unit may be mounted in a vehicle, and the main shaft and the crankshaft may be arranged side by side in a horizontal direction of the vehicle.

According to an embodiment of the present invention, the main shaft and the crankshaft are arranged side by side in the horizontal direction. Thus, the periphery of the cam chain driving sprocket where the cam chain is disposed so as to have a smallest width can be disposed in the vicinity of the clutch mechanism that projects most from the shaft center of the main shaft, and the clutch mechanism and the cam chain driving sprocket can be arranged close to each other. Thus, the power unit can therefore be made compact.

According to an embodiment of the present invention, the cam chain tensioner mechanism may include a cam chain tensioner that presses the cam chain tensioner guide, the cam chain tensioner may be disposed nearer to the valve gear than the cam chain tensioner guide in the direction of the cylinder axis, the cam chain tensioner mechanism may include a tensioner receiving member interposed between the cam chain tensioner and the cam chain tensioner guide, the tensioner receiving member pressing the cam chain tensioner guide by receiving a pressing force of the cam chain tensioner, the tensioner receiving member may be swingably supported on the power unit by a tensioner receiving member swinging shaft, and the tensioner receiving member swinging shaft may be disposed nearer to the valve gear than the cam chain tensioner guide in the direction of the cylinder axis.

According to an embodiment of the present invention, the tensioner receiving member swinging shaft of the swinging tensioner receiving member is disposed nearer to the valve gear than the cam chain tensioner guide in the direction of the cylinder axis. Thus, a tension can be surely provided to the cam chain nearer to the valve gear.

According to an embodiment of the present invention, it is possible to swingably fix the cam chain tensioner guide securely while obtaining a sufficient clearance between the stud bolt and the fixing shaft of the cam chain tensioner pivot mechanism. Thus, a compact and small-sized power unit is provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
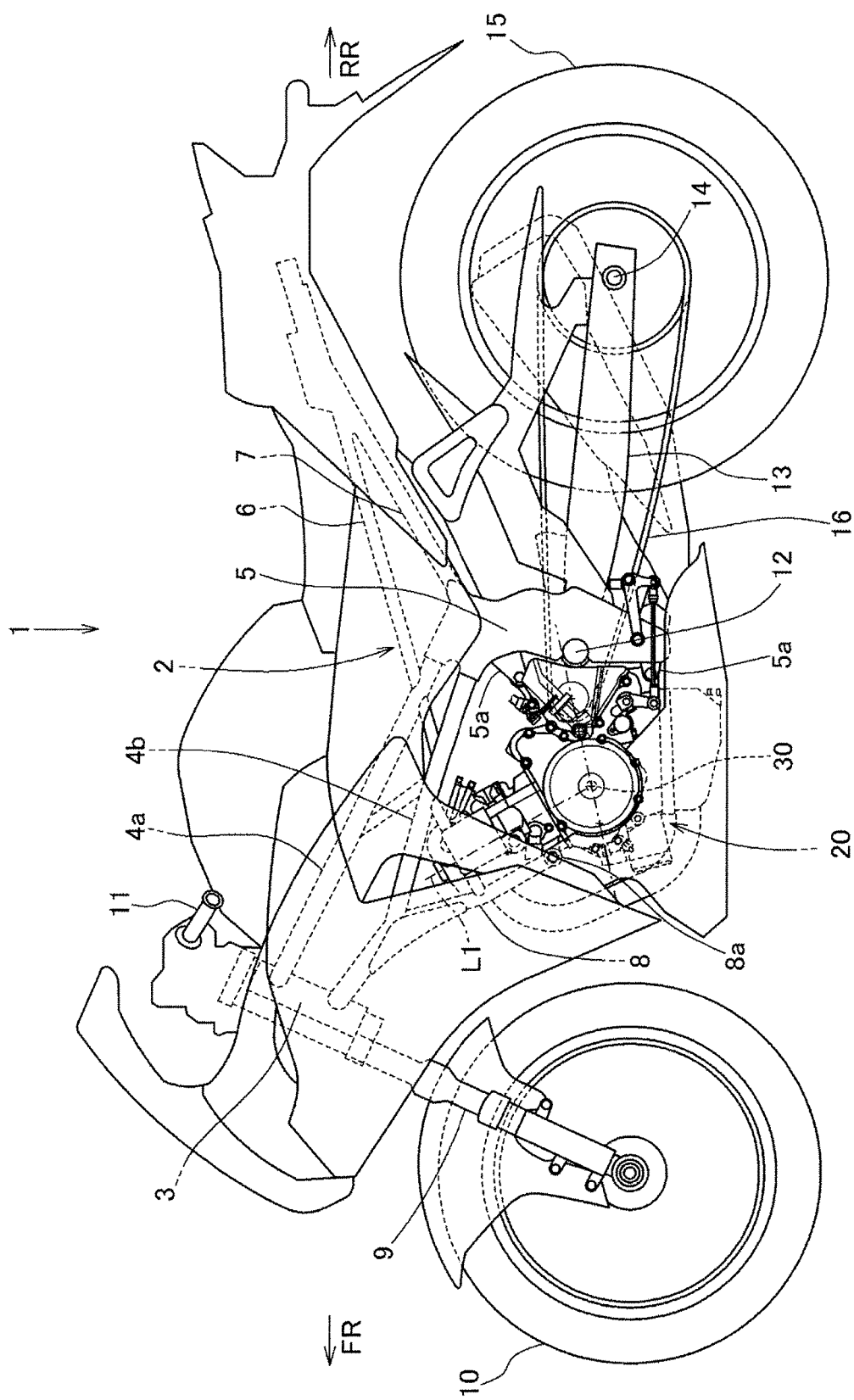
FIG. 1 is a left side view of a motorcycle including a power unit according to one embodiment of the present invention.

A power unit 20 having a cam chain tensioner pivot mechanism according to one embodiment of the present invention will hereinafter be described with reference to FIGS. 1 to 13. FIG. 1 is a side view of a motorcycle 1 including the power unit 20 having a cam chain tensioner pivot mechanism 70 according to one embodiment of the present invention. A forward direction, a rearward direction, a leftward direction, and a rightward direction are defined with relationship to a straight-ahead traveling direction of the motorcycle 1 as a frontward direction of the motorcycle 1 that is oriented frontward as a reference. In the drawings, an arrow FR indicates the forward direction, an arrow RR indicates the rearward direction, an arrow LH indicates the leftward direction, and an arrow RH indicates the rightward direction.

A vehicle body frame 2 of the motorcycle 1 includes a pair of left and right upper side main frame members 4a and a pair of left and right lower side main frame members 4b extending in a rearward and obliquely downward direction from a head pipe 3. Rear ends of the upper side main frame members 4a and the lower side main frame members 4b are coupled to a center frame member 5.

A seat rail 6 extends in a rearward and obliquely upward direction from rear portions of the upper side main frame members 4a and the lower side main frame members 4b. An auxiliary frame member 7 couples the seat rail 6 and the center frame member 5 to each other. A down frame member 8 extends downwardly and obliquely rearwardly from front portions of the lower side main frame members 4b so as to branch downwardly.

A front fork 9 extending downwardly is steerably supported by the head pipe 3. A front wheel 10 is rotatably supported at lower ends of the front fork 9. Steering handlebars 11 are integrally coupled to an upper end of the front fork 9.

A swing arm 13 whose front end is pivotally supported by the center frame member 5 of the vehicle body frame 2 via a swing arm pivot shaft 12 extends rearwardly in a vertically swingable manner. A rear end of the swing arm 13 is provided with a rear wheel 15 pivotally supported by a rear axle 14.

The power unit 20, mounted in the present motorcycle 1, is formed by integrating a four-stroke internal combustion engine 21 adopting a water-cooled two-cylinder DOHC valve system with a transmission 40.

Figure 2:
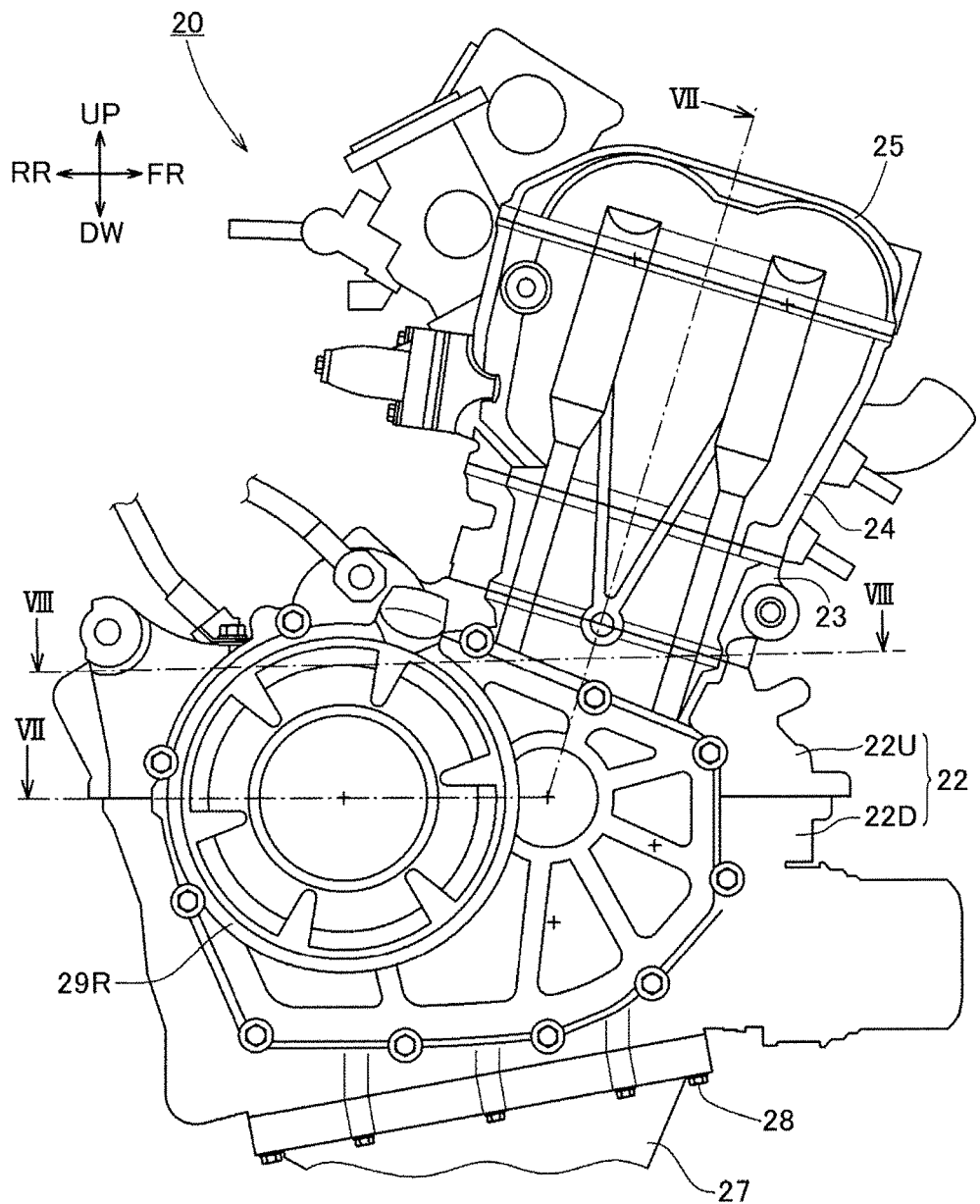
FIG. 2 is a right side view of the power unit in FIG. 1.
Figure 3:
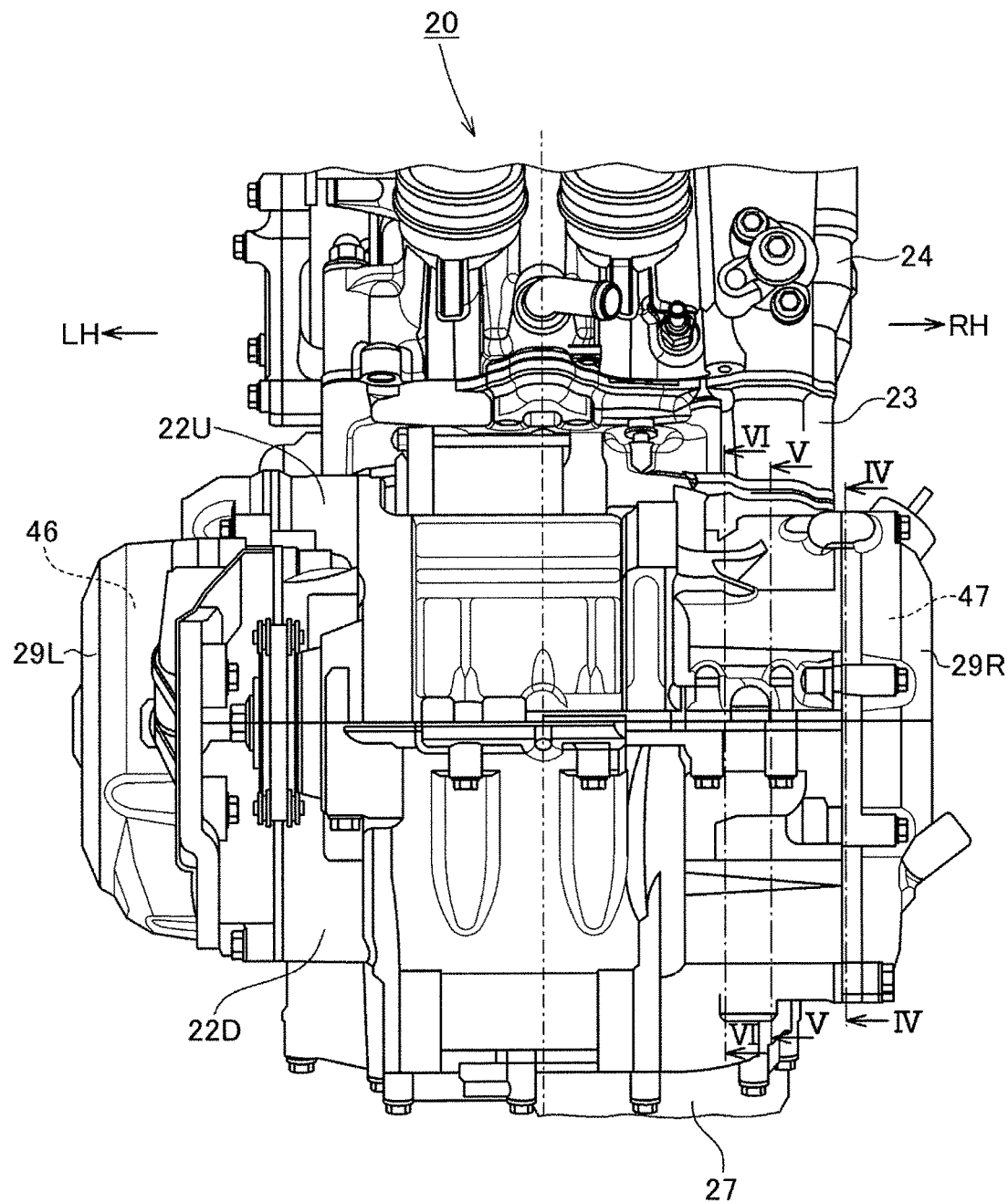
FIG. 3 is a rear view of the power unit in FIG. 1.
Figure 6:
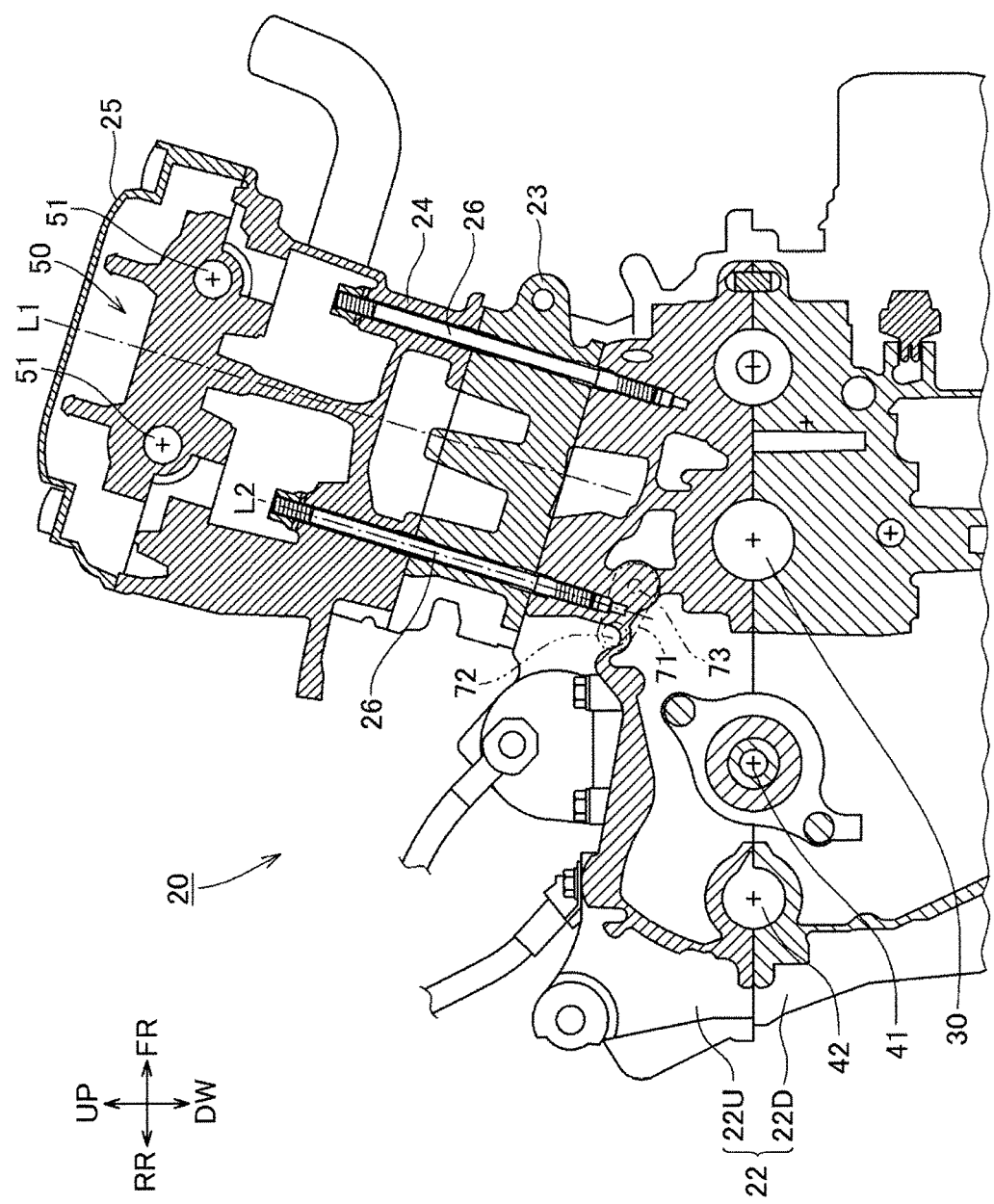
FIG. 6 is a sectional view taken along a line VI-VI of FIG. 3.
Figure 7:
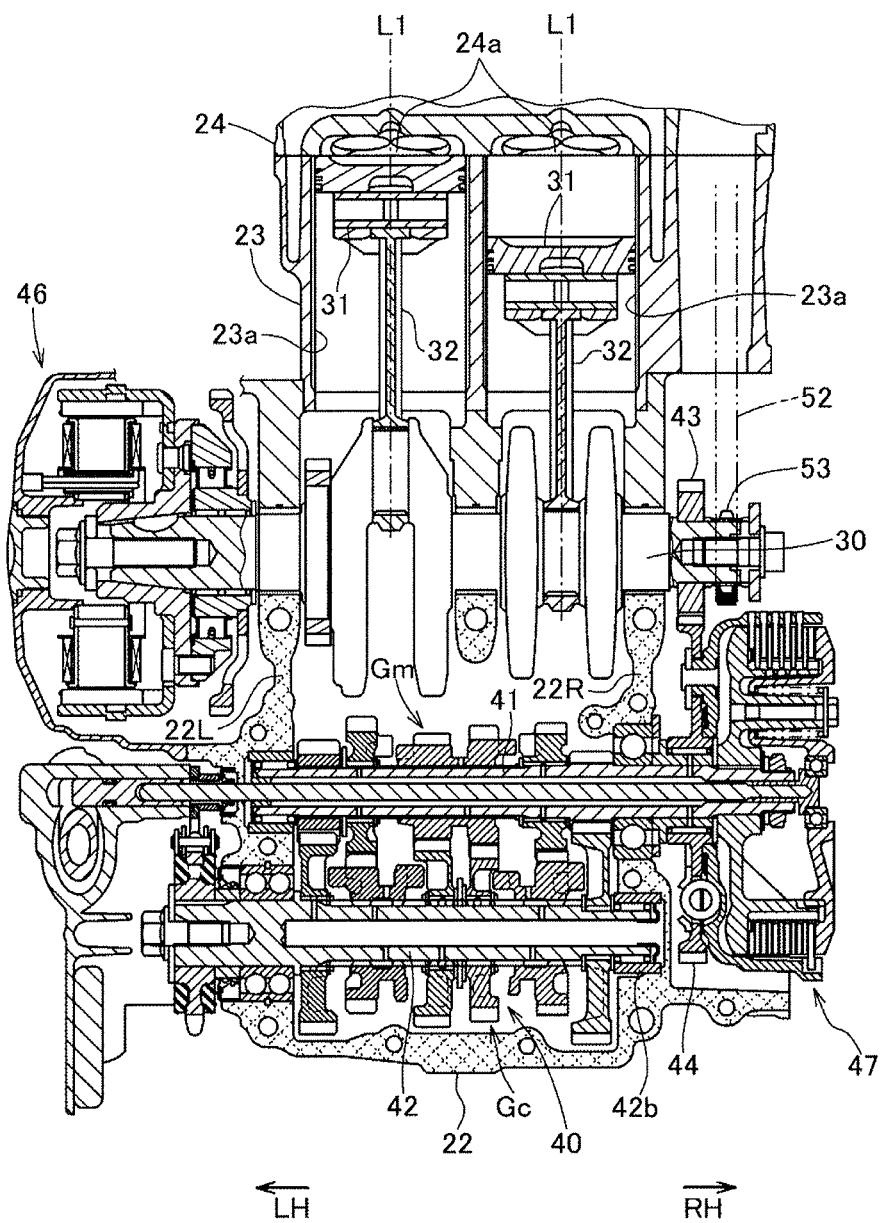
FIG. 7 is a sectional view taken along a line VII-VII of FIG. 2.

FIG. 2 is a right side view of the power unit 20. FIG. 3 is a rear view of the power unit 20. As shown in FIG. 2, the power unit 20 is formed such that a cylinder body 23, a cylinder head 24, and a head cover 25 are superposed on a crankcase 22 in order so as to be in contact with each other, and are integrally fastened to each other by stud bolts 26 as shown in FIG. 6. As shown in FIG. 7, two cylinders 23a are provided in the cylinder body 23. A plurality of stud bolts 26 are arranged so as to surround the two cylinders 23a on the front and rear sides and the left and right sides. In the present embodiment, six stud bolts 26 are provided. Three front-rear pairs of stud bolts 26 are arranged in a left-right direction such that the axes L2 of the stud bolts 26 are parallel with a cylinder axis L1, as shown in FIG. 6.

Further, as shown in FIG. 3, the right side of the crankcase 22 of the power unit 20 is covered by a right case cover 29R, and the left side of the crankcase 22 of the power unit 20 is covered by a left case cover 29L. As shown in FIG. 2, an oil pan 27 is fastened to the undersurface of the crankcase 22 by a bolt 28.

As shown in FIG. 1, the power unit 20 is supported and suspended by a supporting bracket 5a projecting from the center frame member 5 of the vehicle body frame 2 and a lower end 8a of the down frame member 8. The power unit 20 is mounted in the vehicle body frame 2 transversely such that a crankshaft 30 supported by the crankcase 22 is oriented in a left-right width direction of the vehicle body, in a state in which the cylinder axis L1 is slightly inclined frontward.

As shown in FIG. 7, combustion chambers 24a of the internal combustion engine 21 are provided within the cylinder head 24. Intake air valves (not shown) and exhaust valves (not shown) for controlling air intake and exhaust within the combustion chambers 24a are provided to the combustion chambers 24a.

Pistons 31 are slidably provided within the cylinders 23a of the cylinder body 23. With the combustion of a mixture in the combustion chambers 24a, the pistons 31 are slid in the direction of the cylinder axis L1 within the cylinders 23a. The movement of the pistons 31 in the direction of the cylinder axis L1 is transmitted to the crankshaft 30 via connecting rods 32, so that the crankshaft 30 is rotation-driven in a clockwise direction in FIG. 4. As shown in FIG. 1, the rotational driving force of the crankshaft 30 is transmitted to the rear wheel 15 by a driving chain 16.

Figure 4:
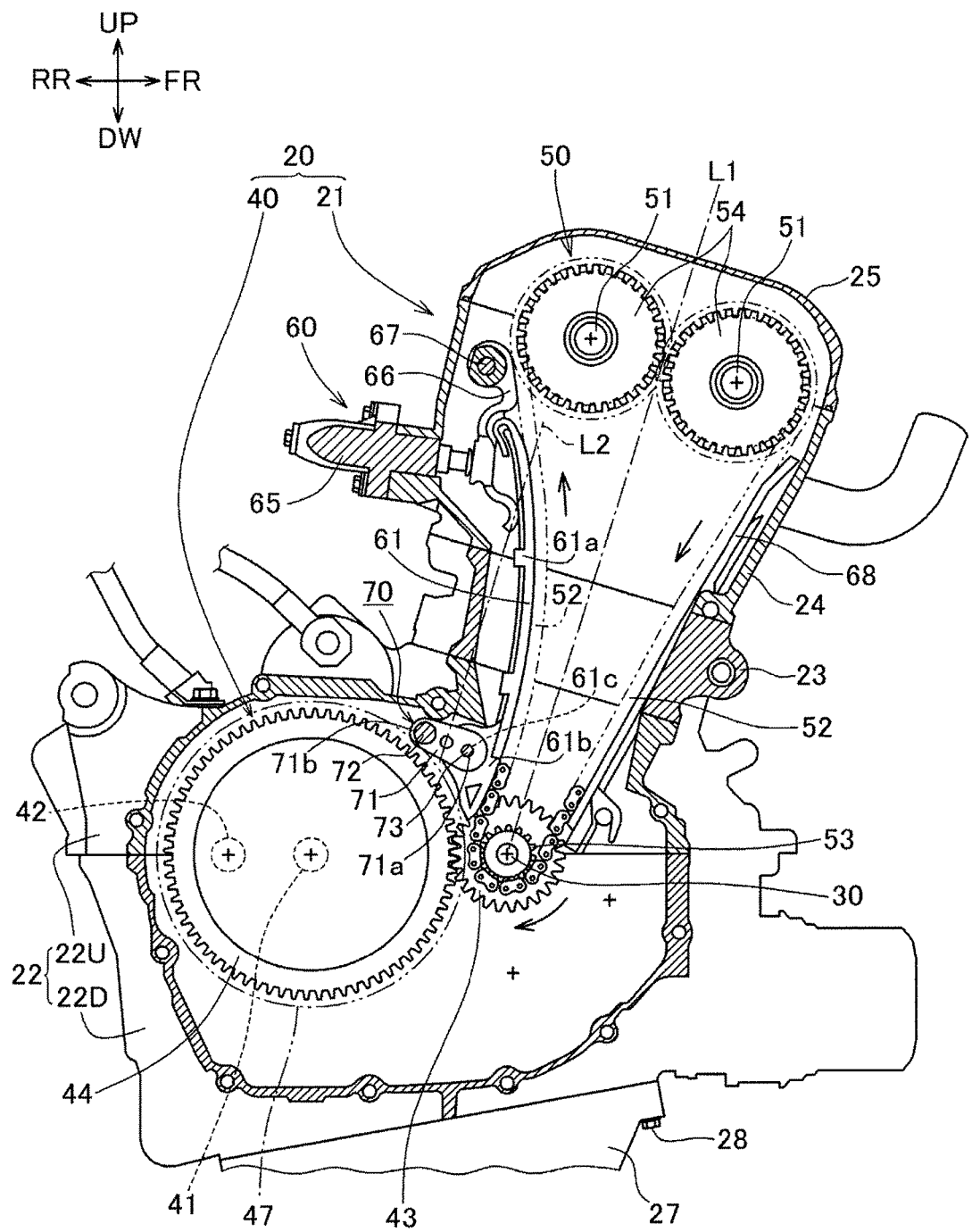
FIG. 4 is a sectional view taken along a line IV-IV of FIG. 3.

As shown in FIG. 4, valve gear 50 is provided within the cylinder head 24 and the head cover 25. The valve gear 50 has a pair of cam shafts 51. The cam shafts 51 are rotatably supported between the cylinder head 24 and the head cover 25 so as to be parallel with the crankshaft 30. The lift amount and timing of the opening and closing of each of the intake air valve and the exhaust valve are controlled by cam surfaces (not shown) provided to the pair of cam shafts 51 as the cam shafts 51 rotate.

As shown in FIG. 4, the crankcase 22 of the power unit 20 is constituted of an upper crankcase half body 22U and a lower crankcase half body 22D as vertically divided half bodies. The crankcase 22 has a structure housing the transmission 40 positioned in the rear of the crankshaft 30, the transmission 40 gear-shifting the driving force of the internal combustion engine 21 to a predetermined speed change stage. As shown in FIG. 7, the transmission 40 is of a constant-mesh type, in which a driving gear group Gm pivotally supported by a main shaft 41 and a driven gear group Gc pivotally supported by a counter shaft 42 mesh with each other so as to correspond to each speed.

As shown in FIG. 6, the crankshaft 30, the main shaft 41, and the counter shaft 42 are arranged in this order from the front so as to be in parallel with each other at the surfaces of the upper crankcase half body 22U and the lower crankcase half body 22D at which surfaces the upper crankcase half body 22U and the lower crankcase half body 22D are divided from each other. The crankshaft 30, the main shaft 41, and the counter shaft 42 are rotatably supported by the upper crankcase half body 22U and the lower crankcase half body 22D. When the power unit 20 is mounted in the motorcycle 1, the crankshaft 30, the main shaft 41, and the counter shaft 42 are arranged in the horizontal direction of the motorcycle 1.

As shown in FIG. 7, the left end of the crankshaft 30 projects to the left side of the crankcase 22 through a left wall 22L of the crankcase 22. An AC generator 46 is attached to the left end of the crankshaft 30. Further, a primary drive gear 43 and a cam chain driving sprocket 53 are fitted to the right end of the crankshaft 30 in this order.

The right end of the main shaft 41 penetrates a right wall 22R of the crankcase 22, and projects to the right side of the crankcase 22. A multiple-disc friction clutch mechanism 47 is attached to the projecting right end of the main shaft 41. The clutch mechanism 47 transmits or cuts off power from the crankshaft 30 to the main shaft 41. A primary driven gear 44 meshing with the primary drive gear 43 supported by the crankshaft 30 is positioned on the inside of the clutch mechanism 47, and is attached to the main shaft 41. The primary driven gear 44 transmits the power from the crankshaft 30 to the clutch mechanism 47.

As shown in FIG. 4 and FIG. 7, a cam chain 52 is wound around the cam chain driving sprocket 53 positioned on the right side of the power unit 20 and provided to the right end of the crankshaft 30 and cam chain driven sprockets 54 provided to the pair of cam shafts 51, respectively. A rotational torque of the crankshaft 30 rotation-driven in a clockwise direction in FIG. 4 is transmitted to the pair of cam shafts 51 via the cam chain driving sprocket 53, the cam chain 52, and the cam chain driven sprockets 54, so that the intake valve and the exhaust valve are opened and closed in a predetermined timing in a combustion stroke of the internal combustion engine 21. In FIG. 4, the direction of rotation of the cam chain 52 is indicated by arrows.

In order to thus open and close the intake and exhaust valves in a predetermined timing, the tension of the cam chain 52 needs to be maintained at a proper level at all times. Accordingly, to prevent free vibration of the cam chain 52 and provide a uniform tension, the power unit 20 is provided with a cam chain tensioner mechanism 60 for pressing the cam chain 52 with a predetermined pressure on the relaxed side of the cam chain 52. A cam chain guide 68 that slidingly guides the running cam chain 52 is provided on an opposite side from the cam chain tensioner mechanism 60.

The cam chain tensioner mechanism 60 includes a cam chain tensioner guide 61 that presses and slidingly guides the running cam chain 52; a cam chain tensioner 65 that presses the cam chain tensioner guide 61 with a predetermined pressure; a tensioner receiving member 66 interposed between the cam chain tensioner guide 61 and the cam chain tensioner 65; and the cam chain tensioner pivot mechanism 70 that swingably supports the cam chain tensioner guide 61.

As shown in FIG. 4, the cam chain tensioner guide 61 includes a cam chain pressing member 61a that presses the cam chain 52 and an attaching portion 61b provided to one end (lower end portion in the present embodiment) of the cam chain pressing member 61a. A swinging shaft insertion hole 61c into which a swinging shaft 73 of the cam chain tensioner pivot mechanism 70 to be described later is inserted is formed in the attaching portion 61b.

Figure 9:
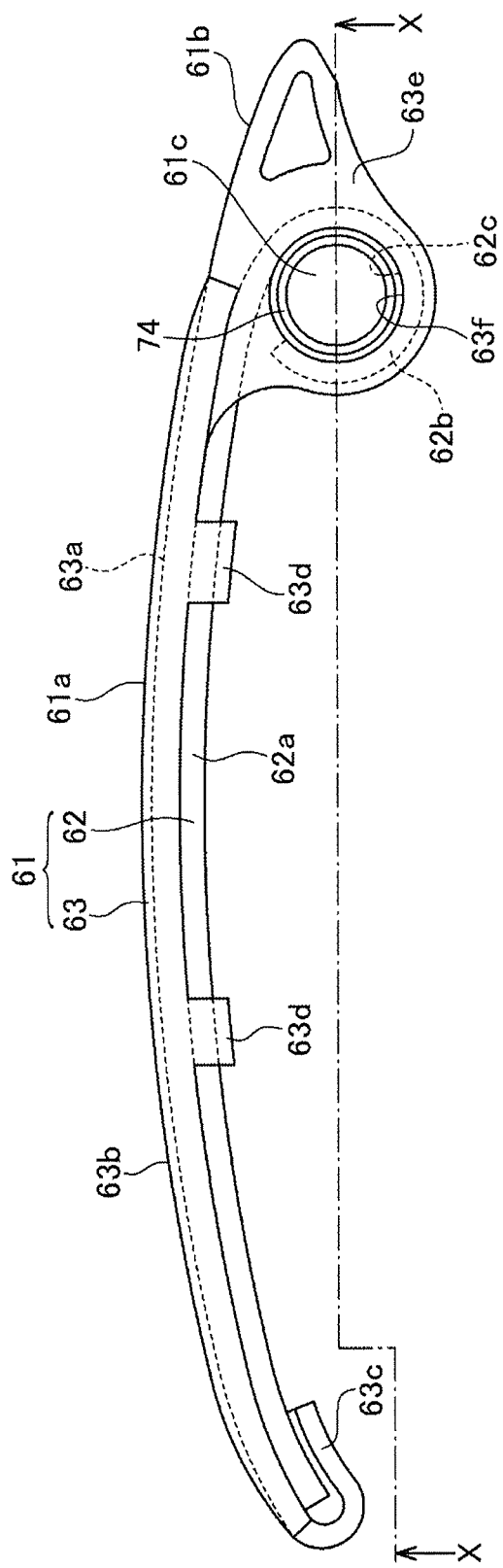
FIG. 9 is a side view of a cam chain tensioner guide.
Figure 10:
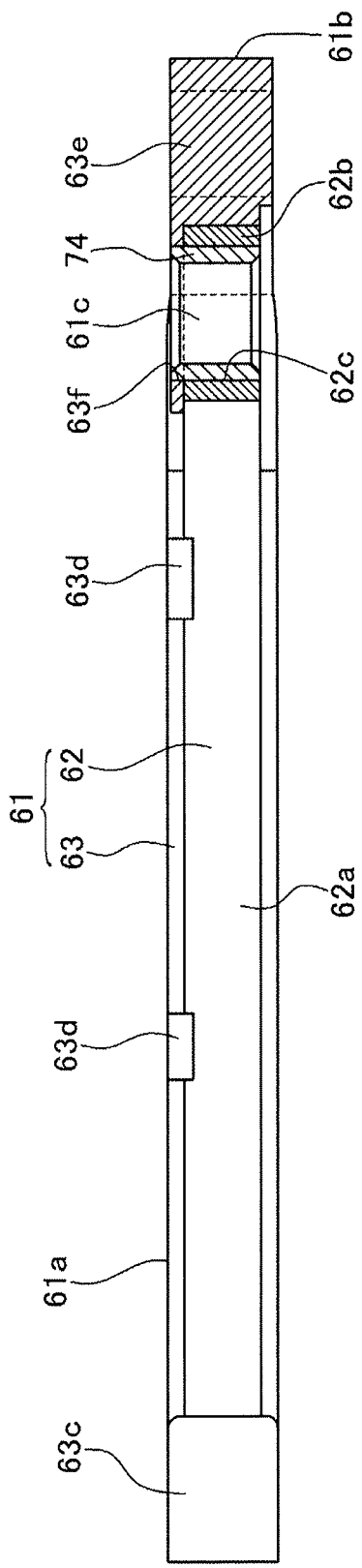
FIG. 10 is a view taken in the direction of arrows X-X of FIG. 9.

As shown in FIG. 9 and FIG. 10, the cam chain tensioner guide 61 includes a guide shoe member 63 having a chain running surface 63a that slidingly guides the running cam chain 52; and a base member 62 that supports the guide shoe member 63 along the running direction of the cam chain 52. The guide shoe member 63 is attached to the base member 62 so as to be integral therewith.

The base member 62 is formed in a curved manner so as to be along the guide shoe member 63 to be described later. An attaching portion 62b having a substantially cylindrical shape to the outside with respect to the cam chain 52 is formed at an end portion of the base member 62 on the cam chain driving sprocket 53 side (lower end portion in the present embodiment (see FIG. 4)). A cylindrical spacer fitting hole 62c into which a cylindrical spacer 74 to be described later is fitted is formed in the center of the attaching portion 62b.

The guide shoe member 63 has the chain running surface 63a formed with a width somewhat larger than the width of the cam chain 52 and with a length extending from the cam chain driving sprocket 53 to the vicinity of the cam chain driven sprocket 54, and formed in a curved manner so as to be along the cam chain 52 to press the relaxed side of the cam chain 52. A fall preventing side edge 63b for preventing the cam chain 52 from falling off is provided on both sides in the longitudinal direction of the chain running surface 63a so as to project from the chain running surface 63a to the cam chain 52 side.

An end portion hooking piece 63c bent outwardly is formed at an end portion of the guide shoe member 63 which end portion is on the side of the cam chain driven sprockets 54 (upper end portion in the present embodiment (see FIG. 4)). As shown in FIG. 10, a plurality of side portion hooking pieces 63d are provided to one side edge in the longitudinal direction of the guide shoe member 63.

The guide shoe member 63 is provided with an attaching portion 63e extending outwardly with respect to the cam chain 52. The attaching portion 63e is formed so as to extend in the shape of a plate to cover the attaching portion 62b of the base member 62 when the guide shoe member 63 is attached to the base member 62. The attaching portion 63e has a cylindrical spacer fitting hole 63f formed at the same position as the cylindrical spacer fitting hole 62c of the base member 62.

The guide shoe member 63 is locked to an end portion of the base member 62 which end portion is on the side of the cam chain driven sprockets 54 by the end portion hooking piece 63c, and locked to the side edge of the base member 62 by the side portion hooking pieces 63d. The guide shoe member 63 is thus integrally attached to the base member 62.

Figure 8:
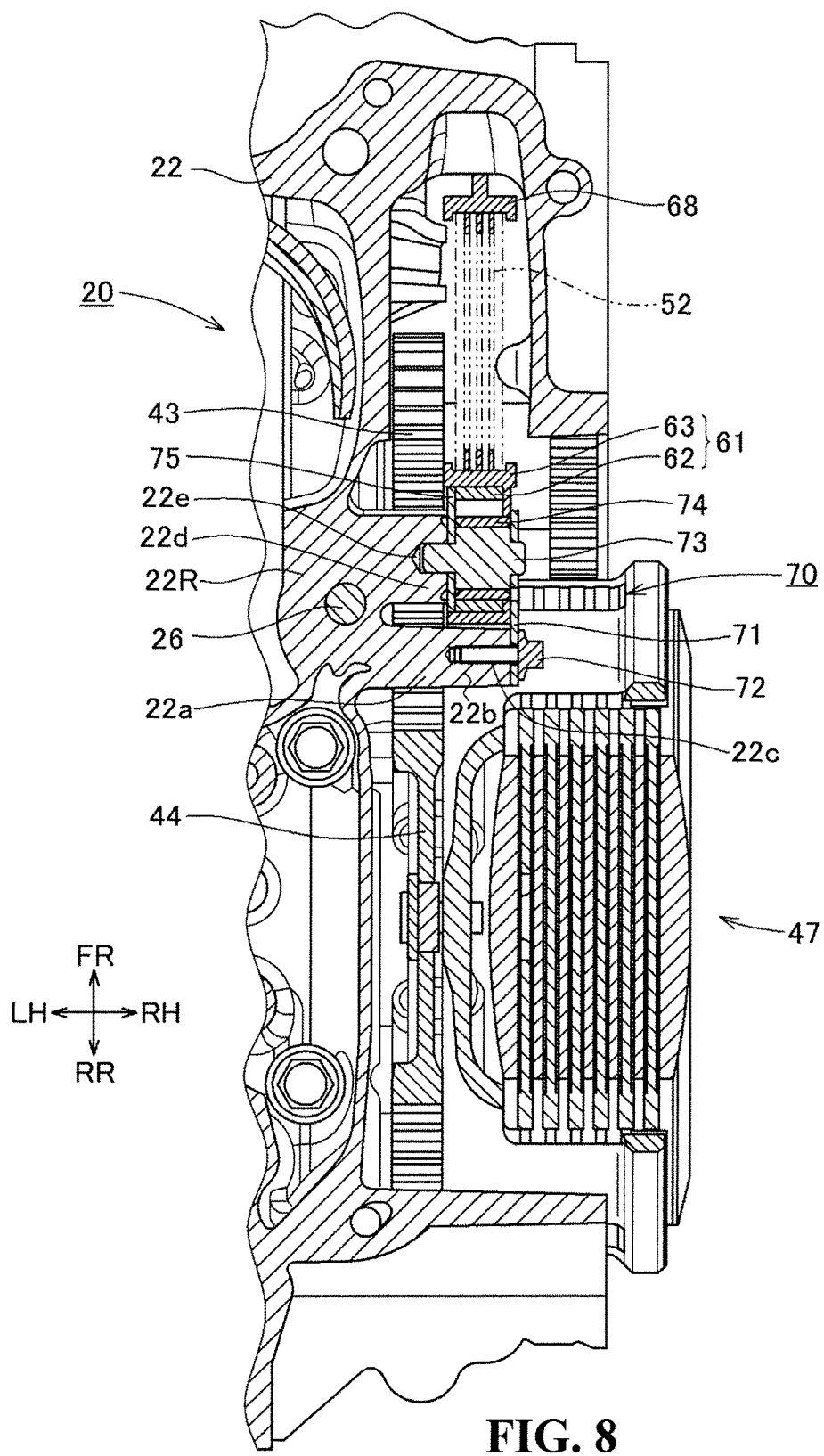
FIG. 8 is a sectional view taken along a line VIII-VIII of FIG. 2.

As shown in FIG. 4 and FIG. 8, the cam chain tensioner guide 61 is swingably supported by a rib 22a of the crankcase 22 via the cam chain tensioner pivot mechanism 70. The cam chain tensioner pivot mechanism 70 includes a pivot plate 71 fixed to the rib 22a (see FIG. 5) of the crankcase 22, to be described later; a fastening bolt 72 as a fixing shaft fixing the pivot plate 71 to the crankcase 22; a swinging shaft 73 inserted through the pivot plate 71 and the cam chain tensioner guide 61, the swinging shaft 73 swingably supporting the cam chain tensioner guide 61; a cylindrical spacer 74 interposed between the swinging shaft 73 and the swinging shaft insertion hole 61c of the cam chain tensioner guide 61; and a rib side plate 75 interposed between the rib 22a and the cam chain tensioner guide 61.

Figure 5:
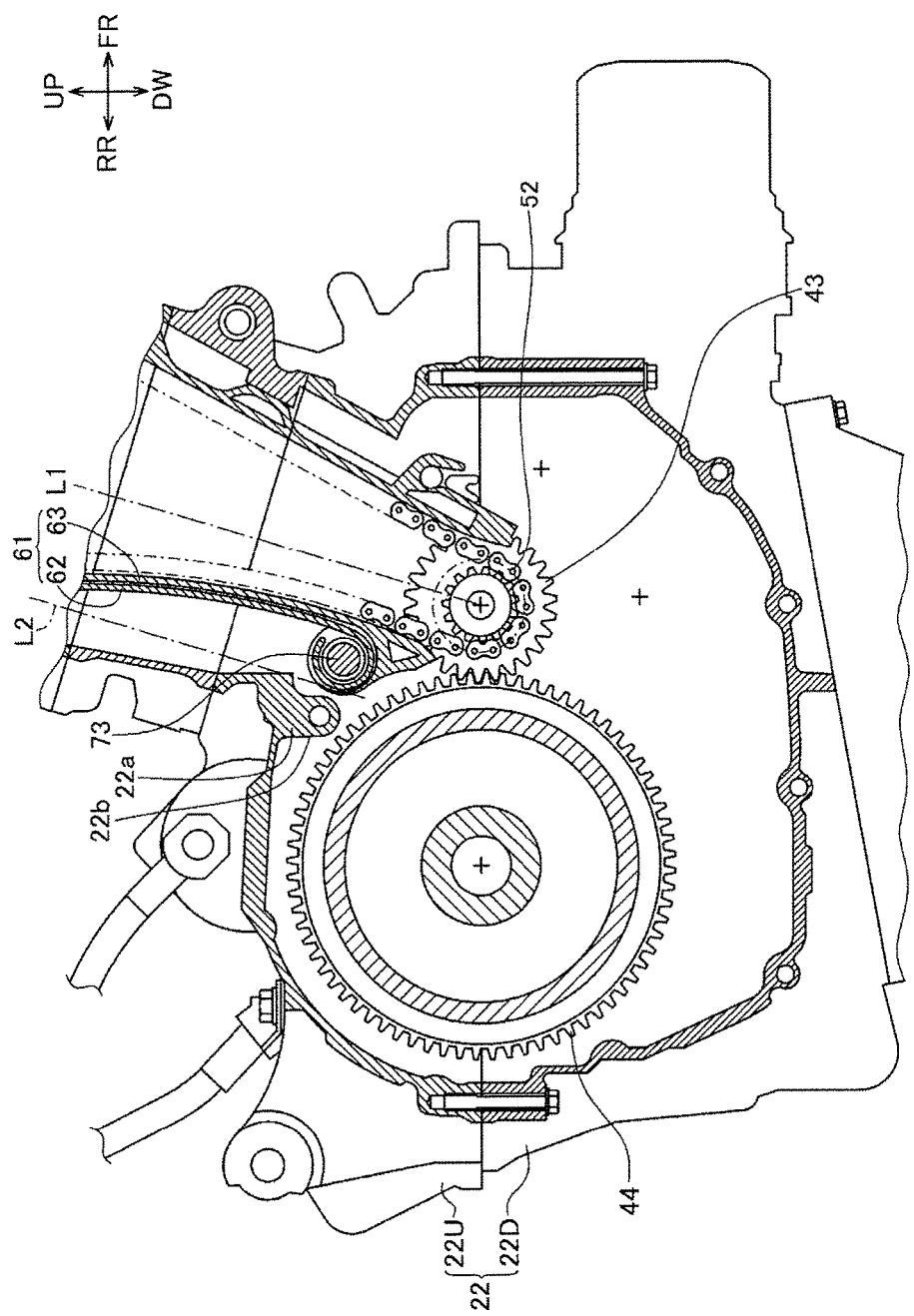
FIG. 5 is a sectional view taken along a line V-V of FIG. 3.

As shown in FIG. 5, the rib 22a is formed in the upper crankcase half body 22U of the crankcase 22 so as to extend from the cylinder body 23 side (from an upper side in the present embodiment) to the inside of the crankcase 22. As viewed from the side of the power unit 20, the rib 22a is positioned in the vicinity of the rear of the axis L2 of the stud bolt 26 positioned in the rear as one of a pair of front and rear stud bolts 26. The rib 22a is provided with a boss portion 22b into which the fastening bolt 72 for attaching the pivot plate 71 is screwed.

Figure 13:
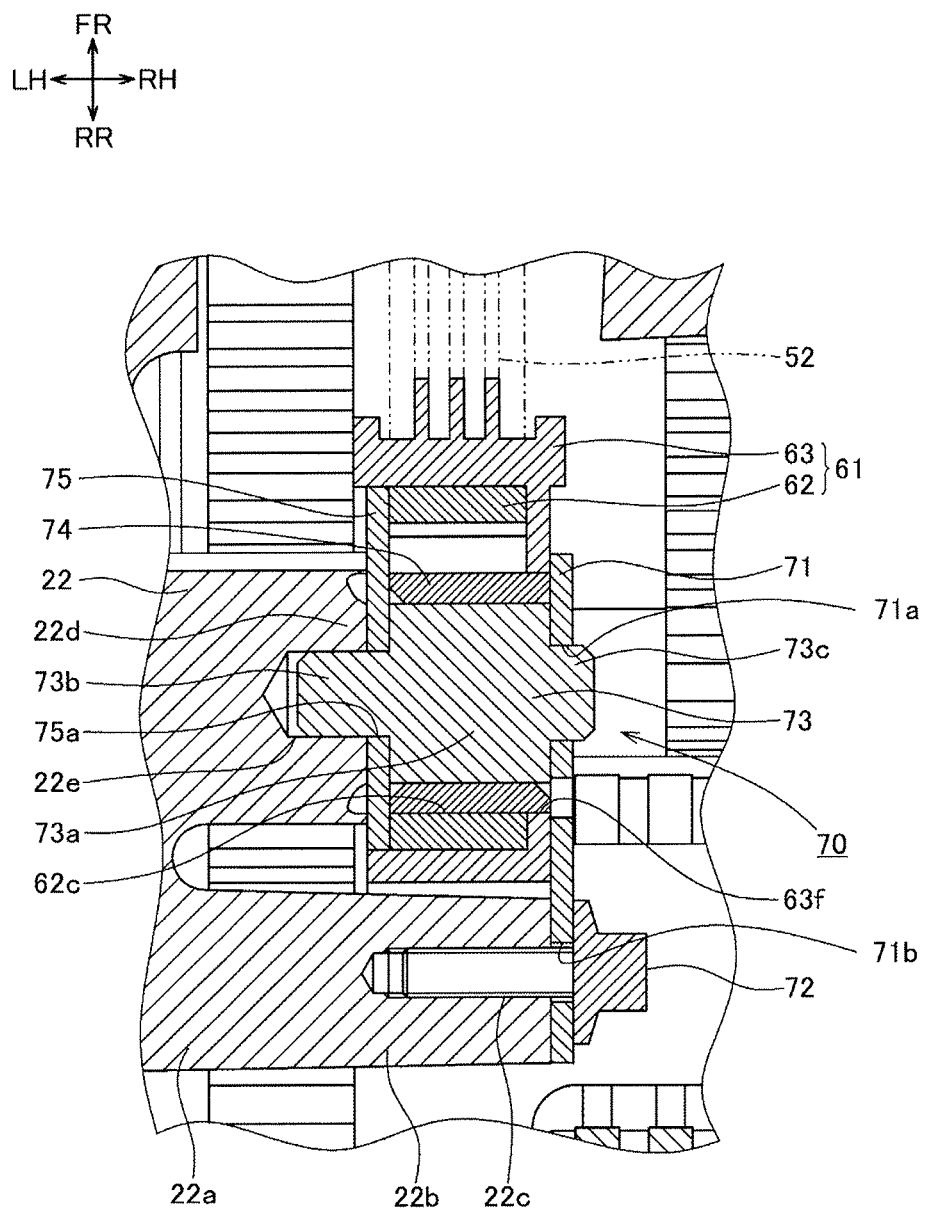
FIG. 13 is a fragmentary enlarged view of a cam chain tensioner pivot mechanism and vicinities thereof in FIG. 8.

As shown in FIG. 8 and FIG. 13, the rib 22a is formed so as to project from the right wall 22R of the crankcase 22 to the right side. The boss portion 22b is formed so as to project further to the right from the rib 22a. A bolt hole 22c into which the fastening bolt 72 is screwed is provided in the center of the boss portion 22b. A swinging shaft attachment boss portion 22d projecting to a smaller amount relative to the boss portion 22b is formed so as to be adjacent to the front of the boss portion 22b. A swinging shaft fitting hole 22e into which the swinging shaft 73 is fitted is provided in the swinging shaft attachment boss portion 22d.

As shown in FIG. 13, the swinging shaft 73 that is inserted through the swinging shaft insertion hole 61c of the cam chain tensioner guide 61 and swingably supports the cam chain tensioner guide 61 includes a cylindrical main body portion 73a; a boss side reduced-diameter portion 73b extending from the main body portion 73a to the rib 22a side and fitted into the swinging shaft fitting hole 22e; and a pivot plate side reduced-diameter portion 73c extending from the main body portion 73a to an opposite side from the boss side reduced-diameter portion 73b.

The pivot plate 71 fixed to the crankcase 22 and swingably supporting the cam chain tensioner guide 61 is formed in the shape of an elliptical plate as shown in FIG. 4. The pivot plate 71 is provided on one side with a swinging shaft insertion hole 71a into which the pivot plate side reduced-diameter portion 73c of the swinging shaft 73 is inserted, and is provided on another side with a fastening bolt insertion hole 71b into which the fastening bolt 72 is inserted.

The cam chain tensioner guide 61 is attached to the crankcase 22 by the cam chain tensioner pivot mechanism 70 as follows. Referring to FIG. 13, the rib side plate 75 abuts against the swinging shaft attachment boss portion 22d of the rib 22a of the crankcase 22. The boss side reduced-diameter portion 73b of the swinging shaft 73 is inserted through a swinging shaft insertion hole 75a of the rib side plate 75, and is fitted into the swinging shaft fitting hole 22e of the swinging shaft attachment boss portion 22d. The cylindrical spacer 74 is fitted to the periphery of the main body portion 73a of the swinging shaft 73. The cam chain tensioner guide 61 is attached such that the cylindrical spacer 74 is inserted into the swinging shaft insertion hole 61c of the cam chain tensioner guide 61. Thereafter, the pivot plate 71 is attached such that the pivot plate side reduced-diameter portion 73c of the swinging shaft 73 is inserted through the swinging shaft insertion hole 71a of the pivot plate 71. The fastening bolt 72 is inserted through the fastening bolt insertion hole 71b of the pivot plate 71, and is screwed into the bolt hole 22c of the boss portion 22b of the crankcase 22. The cam chain tensioner guide 61 is thus swingably supported by the swinging shaft 73. As shown in FIG. 4, as viewed in the axial direction of the crankshaft 30, the fastening bolt 72 as a fixing shaft and the swinging shaft 73 are arranged so as to straddle the axis L2 of a stud bolt 26 located to the rear among the plurality of stud bolts 26.

Further, as shown in FIG. 4, the cam chain tensioner pivot mechanism 70 is disposed closer to the cylinder body 23 side than the crankshaft 30 in a direction of the cylinder axis L1 of the cylinder 23a. More specifically, in the present embodiment, the cam chain tensioner pivot mechanism 70 is disposed above the crankshaft 30. In addition, as shown in FIG. 8, a part of the cam chain tensioner pivot mechanism 70 is disposed so as to overlap the clutch mechanism 47 as viewed in the direction of the cylinder axis L1. In addition, the rib 22a of the crankcase 22 is disposed so as to overlap the primary driven gear 44 positioned on the inside of the clutch mechanism 47 as viewed in the direction of the cylinder axis L1.

As shown in FIG. 4, the cam chain tensioner 65 for pressing the cam chain tensioner guide 61 with a predetermined pressure is provided at a position in the rear of the cam chain tensioner guide 61 on an opposite side of the cam chain tensioner guide 61 from the cam chain 52, which position is nearer to the valve gear 50 (nearer to the top in the present embodiment) in the direction of the cylinder axis L1.

The cam chain tensioner mechanism 60 includes the tensioner receiving member 66 that is interposed between the cam chain tensioner 65 and the cam chain tensioner guide 61 and which presses the cam chain tensioner guide 61 by receiving a pressing force of the cam chain tensioner 65.

Figure 11:
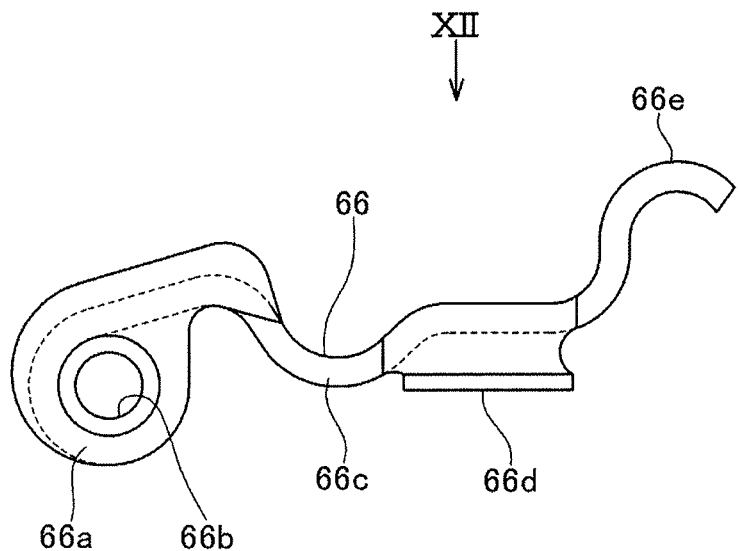
FIG. 11 is a side view of a tensioner receiving member.
Figure 12:
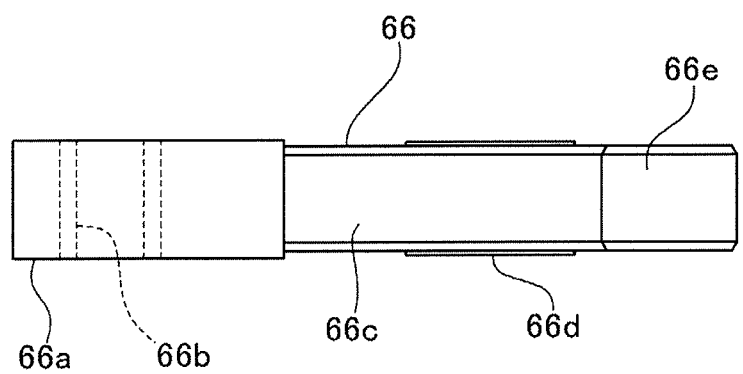
FIG. 12 is a view taken in the direction of an arrow XII of FIG. 11.

As shown in FIG. 11 and FIG. 12, the tensioner receiving member 66 includes an attaching portion 66a provided to one end portion and attached to the cylinder head 24 of the power unit 20; a curved portion 66c extending in a curved manner from the attaching portion 66a; a pressure receiving portion 66d that receives the pressing force from the cam chain tensioner 65; and a pressing portion 66e that is provided to another end portion and abuts against the cam chain tensioner guide 61 to press the cam chain tensioner guide 61. A swinging shaft insertion hole 66b is provided in the attaching portion 66a of the tensioner receiving member 66. A tensioner receiving member swinging shaft 67 is inserted through the swinging shaft insertion hole 66b, and is fixed to the cylinder head 24. The tensioner receiving member 66 is thereby swingably supported by the cylinder head 24. The tensioner receiving member swinging shaft 67 is disposed nearer to the valve gear 50 than the cam chain tensioner guide 61 in the direction of the cylinder axis L1.

The cam chain tensioner guide 61 is swingably supported by the cam chain tensioner pivot mechanism 70 as described above, and is pressed by the cam chain tensioner 65 with a predetermined pressing force via the tensioner receiving member 66 disposed above the cam chain tensioner guide 61. The cam chain 52 is thus maintained at a proper tension. In addition, the tensioner receiving member 66 disposed above the cam chain tensioner guide 61 guides the relaxed side of the cam chain 52 to the cam chain driven sprocket 54. The tension is therefore securely provided to the cam chain 52.

The power unit 20 having the cam chain tensioner pivot mechanism 70 according to the embodiment of the present invention includes the crankcase 22; the cylinder body 23 disposed in contact with the upper part of the crankcase 22; the crankshaft 30 rotatably supported by the crankcase 22; the plurality of stud bolts 26 configured to fix the crankcase 22 and the cylinder body 23 to each other; the cam chain driving sprocket 53 disposed at the right end of the crankshaft 30; the cam chain 52 wound around the cam chain driving sprocket 53, the cam chain 52 transmitting power to the valve gear 50; the cam chain tensioner mechanism 60 including the cam chain tensioner guide 61 providing a tension to the cam chain 52; and the cam chain tensioner pivot mechanism 70 configured to swingably support the cam chain tensioner guide 61 on the crankcase 22; the cam chain tensioner pivot mechanism 70 including the pivot plate 71 fixed to the crankcase 22, the fastening bolt 72 as a fixing shaft fastening and fixing the pivot plate 71 to the crankcase 22, and the swinging shaft 73 inserted through the pivot plate 71 and the swinging shaft insertion hole 61c of the cam chain tensioner guide 61, the swinging shaft 73 swingably supporting the cam chain tensioner guide 61, and as viewed in the axial direction of the crankshaft 30, the fastening bolt 72 and the swinging shaft 73 being arranged so as to straddle the axis L2 of a stud bolt 26 disposed to the rear among the plurality of stud bolts 26.

The fastening bolt 72 is longer than the swinging shaft 73. When the fastening bolt 72 is to be disposed near to the stud bolt 26, a clearance between the fastening bolt 72 and the stud bolt 26 cannot be secured, and thus the fastening bolt 72 cannot be disposed. However, because the present embodiment is configured as described above, it is possible to swingably fix the cam chain tensioner guide 61 surely while obtaining a sufficient clearance between the stud bolt 26 and the fastening bolt 72 of the cam chain tensioner pivot mechanism 70. Thus, the power unit 20 can therefore be miniaturized.

Further, in the cam chain tensioner pivot mechanism 70 disposed closer to the cylinder body 23 side than the crankshaft 30 in the direction of the cylinder axis L1 of the cylinder 23a, the boss portion 22b for fixing the fastening bolt 72 is formed on the rib 22a extending to the inside of the crankcase 22. Thus, the boss portion 22b can be formed easily, and the fastening bolt 72 can be fixed securely while the strength of the boss portion 22b is ensured.

In addition, as viewed in the direction of the cylinder axis L1, the cam chain tensioner pivot mechanism 70 is disposed such that at least part of the cam chain tensioner pivot mechanism 70 overlaps the clutch mechanism 47. Thus, the cam chain tensioner pivot mechanism 70 can be compactly disposed. Thus, the whole of the power unit 20 can therefore be further miniaturized.

The rib is disposed so as to overlap the primary driven gear. Thus, while the clutch and the primary driven gear are disposed in the vicinity of the rib to which the fixing shaft is fixed, the swinging shaft of the cam chain tensioner pivot mechanism is made to support the cam chain tensioner guide. It is therefore possible to dispose the cam chain in the vicinity of the clutch and the primary driven gear while displacing the cam chain. Thus, the power unit can therefore be made more compact.

Further, in a state in which the power unit 20 is mounted in the motorcycle 1, the main shaft 41 and the crankshaft 30 are arranged side by side in a horizontal direction. Thus, the periphery of the cam chain driving sprocket 53 where the cam chain 52 is disposed so as to have a smallest width can be disposed in the vicinity of the clutch mechanism 47 that projects most from the shaft center of the main shaft 41, and the clutch mechanism 47 and the cam chain driving sprocket 53 can be arranged close to each other. Thus, the power unit 20 can therefore be made more compact.

In addition, in the present embodiment, the cam chain tensioner mechanism 60 includes the cam chain tensioner 65 that presses the cam chain tensioner guide 61 with a fixed pressure, the cam chain tensioner 65 is disposed nearer to the valve gear 50 in the direction of the cylinder axis L1 of the cylinder 23a, the tensioner receiving member 66 is interposed between the cam chain tensioner 65 and the cam chain tensioner guide 61, and the cam chain tensioner guide 61 receives a pressing force of the cam chain tensioner 65 via the tensioner receiving member 66. Further, the tensioner receiving member 66 is swingably supported on the power unit 20 by the tensioner receiving member swinging shaft 67, and the tensioner receiving member swinging shaft 67 is disposed nearer to the valve gear 50 than the cam chain tensioner guide 61 in the direction of the cylinder axis L1.

Such a construction can surely provide a tension to the cam chain 52 nearer to the valve gear 50.

The embodiment of the present invention has been described above in detail. However, the present invention is not limited to the foregoing embodiment, but is susceptible of various other changes. In addition, the power unit 20 according to the present invention is not limited to the motorcycle 1, but is widely applicable to other kinds of saddle type vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit having a cam chain tensioner pivot mechanism, the power unit comprising:
    a crankcase;
    a cylinder body including a cylinder, said cylinder being operatively positioned within the crankcase;
    a crankshaft rotatably supported by the crankcase;
    a plurality of stud bolts configured to fix the crankcase and the cylinder body to each other;
    a cam chain driving sprocket disposed at one end portion of the crankshaft;
    a cam chain wound around the cam chain driving sprocket, the cam chain transmitting power to a valve gear;
    a cam chain tensioner mechanism including a cam chain tensioner guide providing a tension to the cam chain; and
    a cam chain tensioner pivot mechanism configured to swingably support the cam chain tensioner guide by a pivot plate fixed to the crankcase by a fixing shaft and a swinging shaft inserted through the cam chain tensioner guide;
    wherein, as viewed in an axial direction of the crankshaft, the fixing shaft and the swinging shaft are arranged so as to straddle an axis of at least one stud bolt of the plurality of stud bolts.

2. The power unit having the cam chain tensioner pivot mechanism according to claim 1, wherein:
    the cam chain tensioner pivot mechanism is disposed nearer to the valve gear than the crankshaft in a direction of a cylinder axis of the cylinder;
    the crankcase is provided with a rib extending from a side of the cylinder body; and
    the rib has a boss portion to which the fixing shaft is fixed.

3. The power unit having the cam chain tensioner pivot mechanism according to claim 2, wherein:
    the crankcase supports a main shaft to which power from the crankshaft is transmitted;
    a clutch mechanism configured to connect and disconnect the power from the crankshaft, said clutch mechanism being disposed at one end portion of the main shaft; and
    the clutch mechanism and at least part of the cam chain tensioner pivot mechanism are arranged so as to overlap each other as viewed in the direction of the cylinder axis.

4. The power unit having the cam chain tensioner pivot mechanism according to claim 3, wherein:
    a primary drive gear for transmitting power from the crankshaft is disposed on one side of the crankshaft;
    a primary driven gear meshing with the primary drive gear on an inside of the clutch mechanism is disposed on one side of the main shaft; and
    the rib is disposed so as to overlap the primary driven gear as viewed in the direction of the cylinder axis.

5. The power unit having the cam chain tensioner pivot mechanism according to claim 4, wherein the power unit is mounted in a vehicle, and the main shaft and the crankshaft are arranged side by side in a horizontal direction of the vehicle.

6. The power unit having the cam chain tensioner pivot mechanism according to claim 5, wherein:
    the cam chain tensioner mechanism includes a cam chain tensioner that presses the cam chain tensioner guide;
    the cam chain tensioner is disposed nearer to the valve gear than the cam chain tensioner guide in the direction of the cylinder axis;
    the cam chain tensioner mechanism includes a tensioner receiving member interposed between the cam chain tensioner and the cam chain tensioner guide, the tensioner receiving member pressing the cam chain tensioner guide by receiving a pressing force of the cam chain tensioner;
    the tensioner receiving member is swingably supported on the power unit by a tensioner receiving member swinging shaft; and
    the tensioner receiving member swinging shaft is disposed nearer to the valve gear than the cam chain tensioner guide in the direction of the cylinder axis.

7. A power unit having a cam chain tensioner pivot mechanism, comprising:
    a crankcase;
    a crankshaft rotatably supported within the crankcase;
    a plurality of stud bolts for fixing the crankcase and a cylinder body to each other;
    a cam chain driving sprocket disposed at one end portion of the crankshaft;
    a valve gear;
    a cam chain wound around the cam chain driving sprocket, the cam chain transmitting power to said valve gear;
    a cam chain tensioner guide for providing a tension to the cam chain; and
    a cam chain tensioner pivot mechanism for swingingly supporting the cam chain tensioner guide by a pivot plate fixed to the crankcase by a fixing shaft and a swinging shaft inserted through the cam chain tensioner guide;
    wherein, as viewed in an axial direction of the crankshaft, the fixing shaft and the swinging shaft are arranged to straddle an axis of at least one stud bolt of the plurality of stud bolts.

8. The power unit having the cam chain tensioner pivot mechanism according to claim 7, wherein:
    the cam chain tensioner pivot mechanism is disposed nearer to the valve gear than the crankshaft in a direction of a cylinder axis of a cylinder positioned within the cylinder body;
    the crankcase is provided with a rib extending from a side of the cylinder body; and
    the rib has a boss portion to which the fixing shaft is fixed.

9. The power unit having the cam chain tensioner pivot mechanism according to claim 8, wherein:
    the crankcase supports a main shaft to which power from the crankshaft is transmitted;
    a clutch mechanism operatively connects and disconnects power from the crankshaft, said clutch mechanism being disposed at one end portion of the main shaft; and the clutch mechanism and at least part of the cam chain tensioner pivot mechanism are arranged so as to overlap each other as viewed in the direction of the cylinder axis.

10. The power unit having the cam chain tensioner pivot mechanism according to claim 9, wherein:
    a primary drive gear for transmitting power from the crankshaft is disposed on one side of the crankshaft;
    a primary driven gear meshing with the primary drive gear on an inside of the clutch mechanism is disposed on one side of the main shaft; and
    the rib is disposed so as to overlap the primary driven gear as viewed in the direction of the cylinder axis.

11. The power unit having the cam chain tensioner pivot mechanism according to claim 10, wherein the power unit is mounted in a vehicle, and the main shaft and the crankshaft are arranged side by side in a horizontal direction of the vehicle.

12. The power unit having the cam chain tensioner pivot mechanism according to claim 11, wherein:
    the cam chain tensioner mechanism includes a cam chain tensioner for pressing the cam chain tensioner guide;
    the cam chain tensioner is disposed nearer to the valve gear than the cam chain tensioner guide in the direction of the cylinder axis;
    the cam chain tensioner mechanism includes a tensioner receiving member interposed between the cam chain tensioner and the cam chain tensioner guide, the tensioner receiving member pressing the cam chain tensioner guide by receiving a pressing force of the cam chain tensioner;
    the tensioner receiving member is swingably supported on the power unit by a tensioner receiving member swinging shaft; and
    the tensioner receiving member swinging shaft is disposed nearer to the valve gear than the cam chain tensioner guide in the direction of the cylinder axis.

13. A power unit having a cam chain tensioner pivot mechanism, comprising:
    a crankcase with a cylinder body being operatively positioned relative to the crankcase;
    a crankshaft rotatably supported by the crankcase;
    a plurality of stud bolts configured to fix the crankcase and the cylinder body to each other;
    a cam chain driving sprocket disposed at one end portion of the crankshaft;
    a cam chain wound around the cam chain driving sprocket, the cam chain transmitting power to a valve gear;
    a cam chain tensioner guide for providing a tension to the cam chain; and
    a cam chain tensioner pivot mechanism configured to swingably support the cam chain tensioner guide, said cam chain tensioner pivot mechanism including a pivot plate fixed to the crankcase by a fixing shaft and a swinging shaft inserted through the cam chain tensioner guide;
    said fixing shaft and the swinging shaft being arranged, when viewed in an axial direction of the crankshaft to straddle an axis of at least one stud bolt of the plurality of stud bolts.

14. The power unit having the cam chain tensioner pivot mechanism according to claim 13, wherein:
    the cam chain tensioner pivot mechanism is disposed nearer to the valve gear than the crankshaft in a direction of a cylinder axis of a cylinder formed within said cylinder body;
    the crankcase is provided with a rib extending from a side of the cylinder body; and
    the rib has a boss portion to which the fixing shaft is fixed.

15. The power unit having the cam chain tensioner pivot mechanism according to claim 14, wherein:
    the crankcase supports a main shaft to which power from the crankshaft is transmitted;
    a clutch mechanism operatively connects and disconnects power from the crankshaft, said clutch mechanism being disposed at one end portion of the main shaft; and
    the clutch mechanism and at least part of the cam chain tensioner pivot mechanism are arranged so as to overlap each other as viewed in the direction of the cylinder axis.

16. The power unit having the cam chain tensioner pivot mechanism according to claim 15, wherein:
    a primary drive gear for transmitting power from the crankshaft is disposed on one side of the crankshaft;
    a primary driven gear meshing with the primary drive gear on an inside of the clutch mechanism is disposed on one side of the main shaft; and
    the rib is disposed so as to overlap the primary driven gear as viewed in the direction of the cylinder axis.

17. The power unit having the cam chain tensioner pivot mechanism according to claim 16, wherein the power unit is mounted in a vehicle, and the main shaft and the crankshaft are arranged side by side in a horizontal direction of the vehicle.

18. The power unit having the cam chain tensioner pivot mechanism according to claim 17, wherein:
    the cam chain tensioner mechanism includes a cam chain tensioner that presses the cam chain tensioner guide;
    the cam chain tensioner is disposed nearer to the valve gear than the cam chain tensioner guide in the direction of the cylinder axis;
    the cam chain tensioner mechanism includes a tensioner receiving member interposed between the cam chain tensioner and the cam chain tensioner guide, the tensioner receiving member pressing the cam chain tensioner guide by receiving a pressing force of the cam chain tensioner;
    the tensioner receiving member is swingably supported on the power unit by a tensioner receiving member swinging shaft; and
    the tensioner receiving member swinging shaft is disposed nearer to the valve gear than the cam chain tensioner guide in the direction of the cylinder axis.

* * * * *